2,500,707

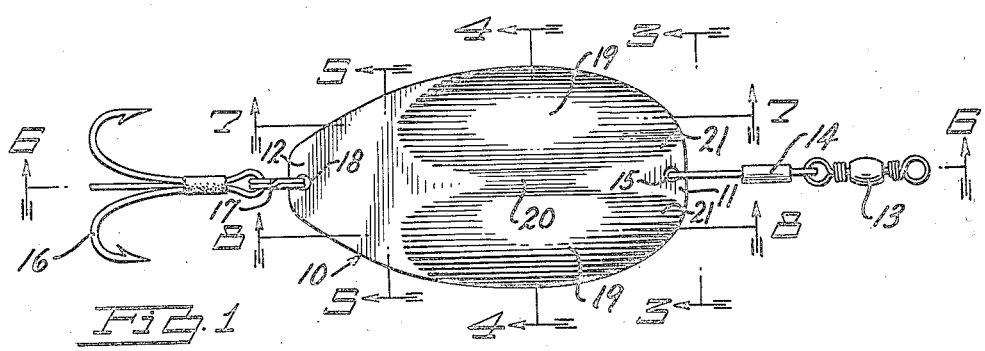
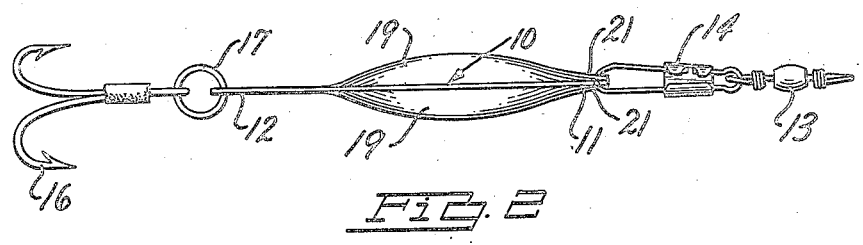
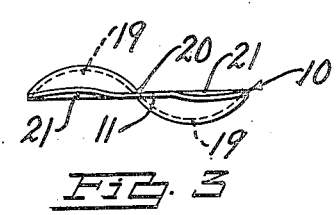
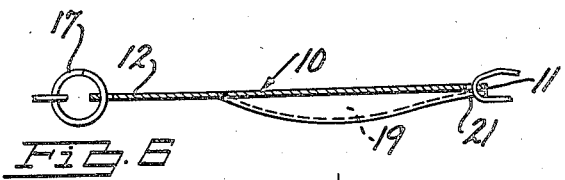
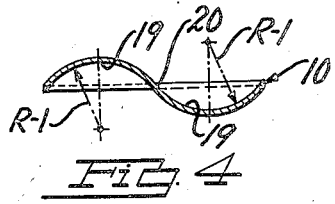
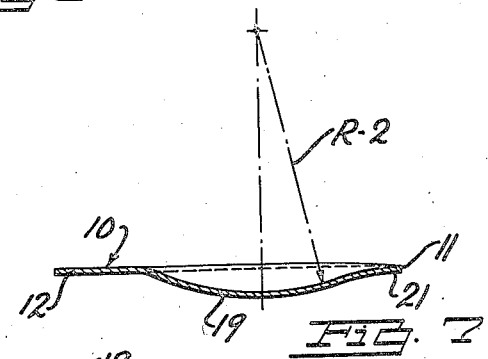
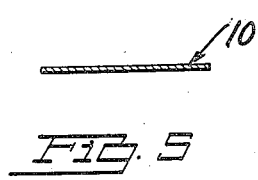
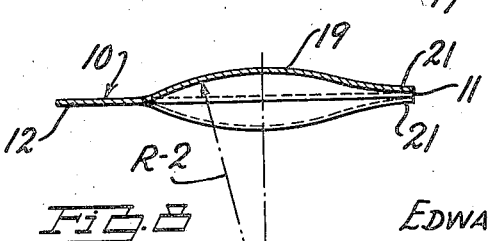
INVENTOR
EDWARD E. ROSINSKI Patented Mar. 14, 1950

UNITED STATES PATENT OFFICE 2,500,707

LURE

Edward E. Rosinski, Detroit, Mich., assignor of one-half to Francis W. Hanyo, Detroit, Mich.

Application February 4, 1948, Serial No. 6,158

2 Claims. (Cl. 43—42.5)

This invention relates to improvements in artificial fish bait and in particular to improvements in fish lures of the spoon type.

The primary object of the invention is to provide an improved spoon type fish lure which has a gentle wobbling action upon slow reeling-in after casting to attract attention of fish without frightening them and which has a combined rotating and wobble action upon relatively rapid reeling-in which goads the game type of fish into striking the lure.

Another object of the invention is to provide an improved spoon type fish lure which is particularly adapted to present a variety of actions during the reeling-in after casting depending upon the rapidity of reeling whereby to provide the essential and desirable features of chugging (lifting bait intermittently during still fishing) when fishing by means of the bait casting method.

Other objects of the invention will become apparent by reference to the following detailed description taken in connection with the accompanying drawing, in which:

Fig. 1 is a plan view of a fish lure embodying the invention.

Fig. 2 is a side elevational view.

Fig. 3 is an end elevational view of the spoon as viewed from the line 3—3 of Fig. 1.

Fig. 4 is a transverse sectional view taken on the line 4—4 of Fig. 1.

Fig. 5 is a transverse sectional view taken on the line 5—5 of Fig. 1.

Fig. 6 is a longitudinal sectional view taken on the line 6—6 of Fig. 1.

Fig. 7 is a longitudinal sectional view taken on the line 7—7 of Fig. 1.

Fig. 8 is a longitudinal sectional view taken on the line 8—8 of Fig. 1.

Referring now to the drawing wherein like numerals refer to like and corresponding parts throughout the several views, the illustrative embodiment of the invention disclosed comprises a spoon element 10 formed of sheet metal which may be silver colored, copper colored or painted with stripes or other designs and which is blunt at its leading end 11 and is tapered to a relatively narrow trailing end 12. A swivel 13 is employed at the leading end 11 of the lure which may be connected thereto by such means as a spring clasp 14 disposed through a suitable aperture 15 through the center of the leading end of the spoon element 10. A triple hook 16 is preferably employed at the trailing end 12 of the lure which may be connected thereto by such means as a spring ring 17 disposed through a suitable aperture 18 through the center of the trailing end of the spoon element 10.

The spoon element 10 is formed from a single piece of flat sheet metal and is provided with a pair of oppositely and longitudinally disposed depressions 19, one depression 19 being located on each side of the longitudinal axis 20 which is maintained in a straight line extending from the leading end 11 to the trailing end 12. At the leading end of each depression 19 the spoon element 10 is preferably formed a scoop 21 to a depth of from one to three times the thickness of the metal from which the spoon element 10 is made, which scoop elements are located in relationship to the horizontal plane of periphery of the said spoon element as indicated in Fig. 3. The transverse axis of each of the said depressions 19 lies forward of the center of the spoon element 10, and the said depression 19 is preferably transversely formed substantially on a radius R—1. The longitudinal axis of each of the said depressions 19 lies at approximately the quarter point of the maximum width of the spoon element 10, and the said depression 19 is preferably longitudinally formed substantially on a radius R—2. The radius R—2 of the longitudinal axis of the depressions 19 is preferably 3 to 5 times longer than the radius R—1 of the transverse axis of the said depressions 19, all depending upon the degree of action required of the lure. Toward the extreme ends and sides of the said depressions 19, the curvature thereof may be worked into any desired compound curve just so long as the periphery and the center of the spoon element 10 remain in a single plane except at the scoops 21 at the leading ends of the said depressions 19 which are formed slightly below the plane of the periphery of the spoon element 10 on the side to which the depression is made. These scoops at the leading ends of the depressions 19 provide a rotating action as well as a wobble action to lures embodying the invention during rapid reeling-in.

This particular construction of the spoon element 10 has been found to produce superior results in bait casting. In the use of lures embodying the invention in relatively deep water fishing, the lure is preferably cast out and allowed to settle to a point just above the bottom of the water in which the fishing is being done. The lure is then reeled in slowly to maintain it off the bottom. During this slow reeling, a slight wobble action occurs which attracts fish from their habitat near the bottom of a lake or pond. Ofttimes the fish will follow the lure during its slight wobble action all of the way to the surface. However, by occasionally reeling rapidly, the lure will become activated and rotate as well as wobble causing game fish to strike it. The same general procedure is used in surface or near surface fishing by reeling-in after casting before the lure has had an opportunity to sink.

Although but a single embodiment of the invention has been disclosed and described in detail, it is obvious that many changes may be made in the size, shape, arrangement and detail of the various elements thereof without departing from the spirit and scope of the invention as defined by the appended claims.

I claim:

1. In a fish lure of the spoon type comprising a sheet metal spoon element having a blunt leading end and a tapered trailing end, a swivel connected to the said spoon element at its leading end, and a hook connected to the said spoon element at its trailing end, said spoon element having a pair of oppositely and longitudinally disposed depressions formed therein one at each side of the longitudinal axis thereof and having their transverse axes located forwardly of the transverse axis of the said spoon element, the center of the said spoon element and the periphery thereof being disposed in substantially the same plane except at the leading end thereof, and the said spoon element having scoops formed therein at the leading edge thereof communicating with the said depressions.

2. In a fish lure of the spoon type comprising a sheet metal spoon element having a blunt leading end and a tapered trailing end, a swivel connected to the said spoon element at its leading end, and a hook connected to the said spoon element at its trailing end, said spoon element having a pair of oppositely and longitudinally disposed depressions formed therein one at each side of the longitudinal axis thereof and having their transverse axes located forwardly of the transverse axis of the said spoon element, the longitudinal and transverse contour of each of the said depressions being formed substantially on radii from a point located on a line normal to the center of the depression, the longitudinal radius being from three to five times longer than the transverse radius, the center of the said spoon element and the periphery thereof being disposed in substantially the same plane except at the leading end thereof, and the said spoon element having scoops formed therein at the leading edge thereof communicating with the said depressions.

EDWARD E. ROSINSKI.

REFERENCES CITED

The following references are of record in the file of this patent:

UNITED STATES PATENTS

| Number | Name | Date |
| --- | --- | --- |
| 1,692,674 | Mapel | Nov. 20, 1928 |
| 1,856,649 | Mapel | May 3, 1932 |
| 1,883,695 | Goerke | Oct. 18, 1932 |
| 1,903,558 | Taylor | Apr. 11, 1933 |